United States Patent [19]
Grosskopf et al.

[11] 3,980,812
[45] Sept. 14, 1976

[54] METHOD AND MEANS FOR ELECTRONIC IMAGE ANALYSIS WITHIN A RASTER-SCANNED FIELD

[75] Inventors: Rudolf Grosskopf, Koenigsbronn; Hubert Jager, Koenigsbronn-Zang, both of Germany

[73] Assignee: Carl Zeiss-Stiftung, Oberkochen, Germany

[22] Filed: Jan. 17, 1975

[21] Appl. No.: 542,012

[30] Foreign Application Priority Data

Jan. 25, 1974 Germany ............................ 2403502

[52] U.S. Cl. ...................................... 178/6.8; 178/6; 178/DIG. 36

[51] Int. Cl.[2] ............................................ H04M 7/18

[58] Field of Search ................... 178/6.8, DIG. 36, 6

[56] References Cited

UNITED STATES PATENTS

| | | | |
|---|---|---|---|
| 3,579,249 | 5/1971 | Dewey | 178/6.8 |
| 3,621,129 | 11/1971 | Fisher | 178/6.8 |
| 3,801,741 | 4/1974 | Ablett | 178/6.8 |

*Primary Examiner*—Robert L. Griffin
*Assistant Examiner*—Edward L. Coles
*Attorney, Agent, or Firm*—Nichol M. Sandoe

[57] ABSTRACT

The invention contemplates an improved method of electronic-image analysis within a field of raster-scanned subject matter in which each scanning line lying within the boundaries of an object to be evaluated supplies by means of a discriminator a binary signal corresponding to the line length between object-boundary intercepts for the particular line. The improvement involves production of a localized search signal synchronized with raster scanning such that the search signal is effectively located within at least part of the scan-line coverage of the object. The search signal is used to control for each scan line the delay time of the binary signal of the same scan line, said delayed binary signal starting an output signal, the delay time of said binary signal being so controlled that it lies between a scan line period $T_1$ and a minimum time $T_2$ and depends upon the time interval between the start of said binary signal and of said output signal. The output signal in each following scan line is started by the delayed output signal of the foregoing scan line or the output signal of the line just scanned, depending upon which signal starts earlier. The binary signal of each scan line is also separately delayed by one scan line period in order to produce an anticoincidence pulse when the thus-delayed binary signal and instantaneously produced binary signal fail to overlap. Finally, an evaluation-output signal is produced upon observation of coincidence as between the output signal and the anticoincidence pulse.

17 Claims, 6 Drawing Figures

METHOD AND MEANS FOR ELECTRONIC IMAGE ANALYSIS WITHIN A RASTER-SCANNED FIELD

The present invention relates to a method and means for quantitative evaluation of objects in a field which has been scanned by a raster device to produce an electrical signal, and in particular to use of a discriminator to create a binary signal corresponding to the objected-intercepted length of each scanning line which passes within boundaries of an object to be evaluated.

To measure the size, shape and number of discrete particles or features in a flat field, for example the viewed field of a microscope, the field is scanned in a raster pattern by means of a focused beam, for which a beam of light or an electronic beam may be used. Such scanning produces electric output signals at a receiver, such as a photocell, a photomultiplier or a television camera tube. These scan-derived signals are fed to a so-called discriminator, which supplies binary signals whenever the video signals of objects to be evaluated meet preselected criteria. The binary signal of the discriminator is then fed to an evaluation unit which measures the values to be determined, for instance the number of objects.

Without further procedure, it is not possible to determine whether or not signals in consecutive scanning lines come from the same particle. In an effort to solve this problem, it is known to repeat all scan signals with a one-line delay and, through redundancy (the overlap criterion), to recognize signals occurring in two successive lines as coming from one particle when the signals overlap in the scanning direction. When the redundancy (overlap) is observed to cease, a so-called anticoincidence point is noted, and a pulse is generated to identify the anticoincidence point which has just been observed as a characteristic of the scanned particle.

It is already known to delay the scanning signals in the scanning direction and in this way, starting from the edge of a particle, to effectively remove (in a predetermined direction and within each scanning line) a certain length of the particle, i.e., to displace the edge of the particle by a predetermined distance. This process is known as length discrimination, and gives information on the size distribution of the objects to be evaluated. But if the anticoincidence criterion is used in this connection, it may happen that several anticoincidence pulses are generated for one single object, in the case of evaluating an irregular object pattern, for which chord overlap (for successive scan lines) is interrupted and is therefore not continuous between border intercepts of the scanned single object. In this circumstance, the single scanned object is counted more than once, thus giving rise to an uncertainty in what was intended to be a quantitative measurement.

Generally, the field to be evaluated contains a large number or even a very large number of objects, and it is difficult to select and extract from this field a very specific object for evaluation. In an effort to make such a selection, it is known to employ a light-writing pen, so directed at the localized area of the viewing field as to "pin-point" the desired object for evaluation. Such an operation is, however, tedious and tiresome, and evaluation by this technique is relatively expensive.

It is, accordingly, an object of the invention to provide an improved method and apparatus of the character indicated.

It is a specific object to achieve the above object without making a multiple count of a given single object or particle in the course of a given evaluation, regardless of border irregularity in the viewed particle.

Another specific object is to achieve the foregoing objects through an automatic and non-fatiguing process of selection of an object to be evaluated.

A general object is to provide a device for implementing the foregoing objects, with relatively simple construction and at relatively low expense.

The method of the invention is characterized (*a*) by producing a "search signal" which extends over at least a part of a scanning line at the location of an object to be evaluated, (*b*) by using this search signal to produce an output signal and at the same time to delay the binary signal coming from the discriminator wherein the delay is determined by the time interval between start of the binary signal (first border intercept of a scan line upon an object) and the start of said output signal, (*c*) starting said output signal of each scan line by the delayed output signal of the foregoing scan line or by the output signal of the preceding scan line, depending upon which signal starts earlier, (*d*) delaying the binary signal of each scan line by one scan-line period and producing an anticoincidence pulse when this delayed signal and the binary signal of the line just scanned do not overlap, and (*e*) generating an evaluation-output signal upon detected coincidence between said output signal and said anticoincidence pulse.

By means of this new technique, it is possible in a controllable manner to select a predetermined object and to evaluate this object independently of its shape. Furthermore, the new process makes it possible, in the case of length discrimination, to avoid "split-up" (i.e., multiple counting) of the objects to be evaluated.

In selecting individual objects to be evaluated, it is advantageous to generate a search signal which can be displaced as desired over the entire scanned picture region and which is displaced (as by a manual manipulation of a control element) into at least partial overlap with the object to be evaluated in each case, the search signal location and its displacement being observable on a monitor display of the viewing field from which selection is made. The search signal may in this connection be an individual pulse or a field defined by plural pulses. There then appears on the monitor a light spot or a brightened local area which can be readily displaced to the object to be evaluated, all with continuous visual observation at the monitor display. As soon as the search signal partially covers the object to be evaluated, the evaluation of this object takes place.

Upon each length discrimination of a particle, the binary signal coming from the discriminator is shortened in each scanning line by a predetermined amount; in the new method, the signal thus obtained is used for search signal purposes.

Apparatus for carrying out the new process is characterized by two delay lines connected in series; the second of these delay lines is characterized by delay for a period of time which is smaller than a line-scanning interval, and the first of these is a delay line having various distributed-tap inputs connected with individual switches. Depending on the input used, a signal fed to the first delay line is delayed by a period of time which is between zero and a value corresponding to the difference between a line-scanning interval and the delay time of the second delay line. The output of the discriminator is connected with the maximum-delay input of the first delay line, to provide maximum delay of the discriminator output signal, while the output of the second delay line is connected with the input of a bi-stable device, for setting the same. This device generates the output signal which is connected on the one hand with an evaluation unit and, parallel to it, with the switches associated with the input taps of the first delay line, the arrangement being such that, upon the ocurrence of an output signal from the bi-stable device, one of the switches is effective to establish a given delay time of the first delay line. The erasure input of the bi-stable device is connected, via a negated (inverted) OR gate, with the "direct" discriminator output signal and with a "delayed" discriminator output signal, wherein the delay is to the extent of a one-line scan interval.

The invention will be explained in further detail below with reference to FIGS. 1 to 6 of the accompanying drawings, in which.

Figure 1:
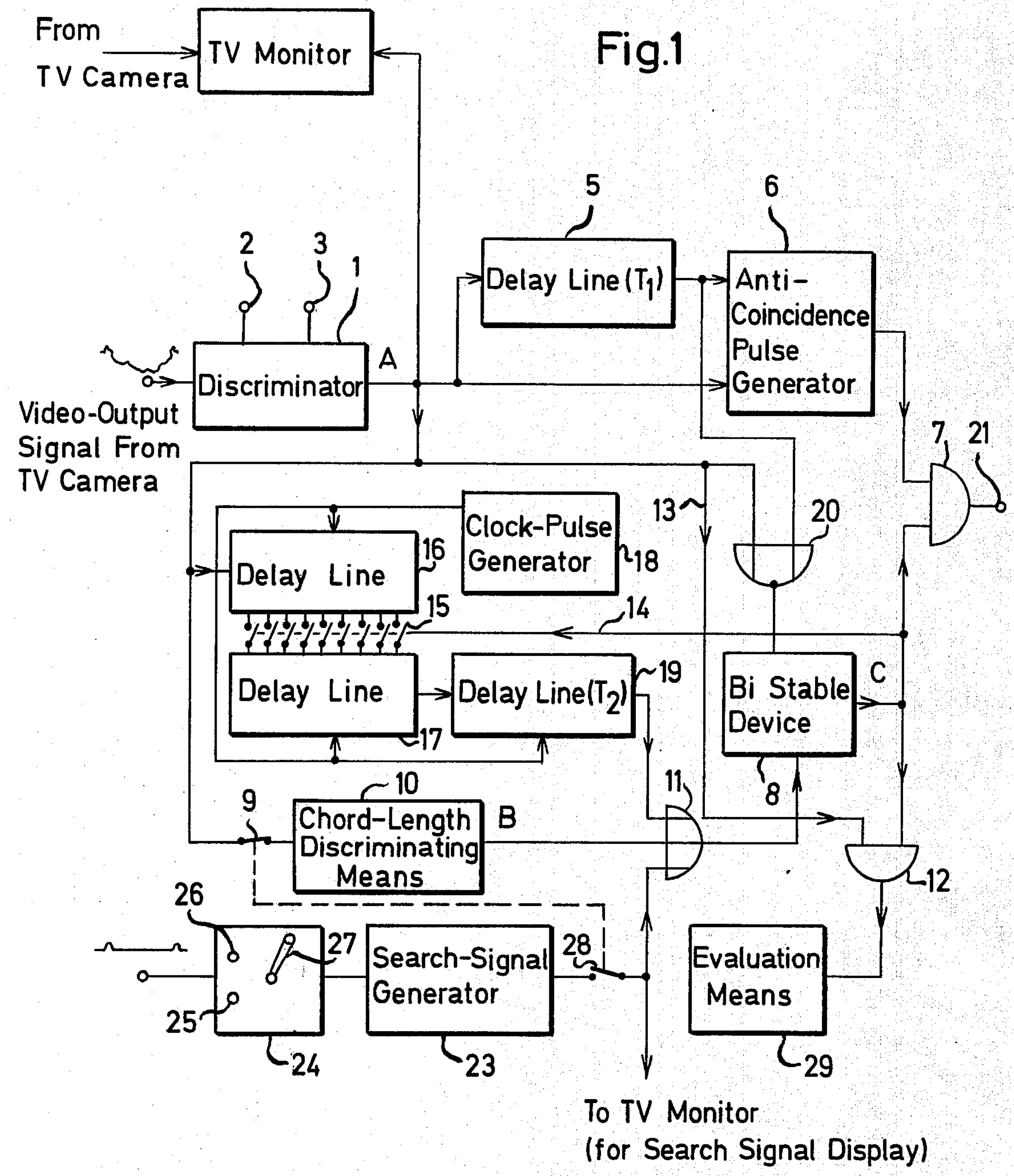
FIG. 1 is a block diagram of one embodiment of apparatus in accordance with the invention.
Figure 3:
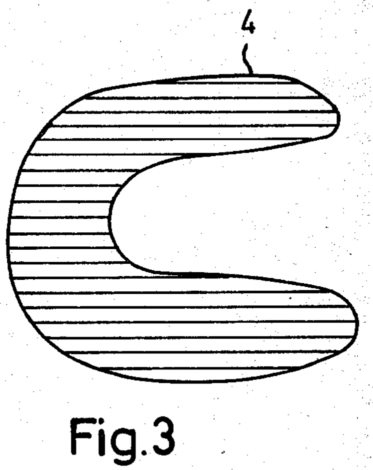
FIG. 3 depicts an irregularly shaped particle to be evaluated, with scanning lines drawn thereon.

In FIG. 1, the video output from a television-camera system (not shown) is fed to a discriminator 1, to which voltages are applied at 2 and 3 for the preselection of amplitude threshold. Voltages at 2 and 3 enable selection of first and second amplitude thresholds, whereby the video portion of the TV-output signal is exclusively utilized to derive clear identification of the margin intercepts of each scan line with the scaned object to be evaluated; discriminator may thus include a bi-stable flip-flop, having a first stable state (L) for video signals above a level determined at 3 but nevertheless representing less than object brightness, and having a second stable state (O) for video-signal levels above a predetermined level supplied at 4, the latter being predetermined as the maximum object brightness to be recognized for evaluation. There is thus present at the discriminator output A a binary signal which is indicative of the presence of particles to be evaluated in the field; this binary signal corresponds to and remains for the chord length of each of the respective scan lines within these objects. Such signals are shown in FIG. 3, as a succession of vertically spaced horizontal chord lines, within the boundaries of the object 4 to be evaluated, and it will be understood that chord lengths of these scanning lines may appear intensified in the display of a suitable monitor (suggested by legend). As the start of each such chord line, the A signal reaches the value L, while at the end of each such chord line it reaches the value O.

The A signal supplied by the discriminator is fed to a first delay line 5 which delays by a full line-scanning interval $T_1$. The delayed A signal and the A signal coming directly from the discriminator 1 are fed jointly to a device 6 which produces pulses at the anticoincidence points. These pulses are fed to one input of an AND gate 7, the other input of which is supplied by the output signal of a bi-stable device or flip-flop 8.

Figure 4:
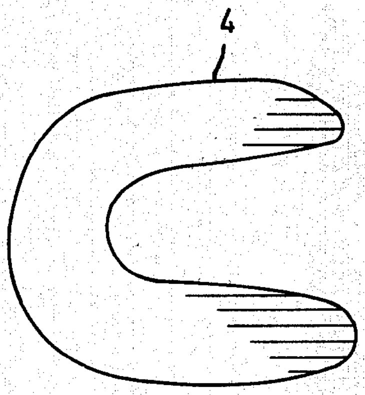
FIG. 4 depicts the particle shown in FIG. 3, after mere length discrimination of the scan lines.

If a switch 9 is closed, the binary signal A is also fed to chord-length discrimination means 10 which effects a length discrimination in the scanning direction and produces, at B, a signal sequence creating the horizontal-line pattern of FIG. 4. As can be seen from FIG. 4, the object 4 has been effectively split up upon length discrimination, into what now appear to be two individual particles; in a pure application of the anticoincidence criterion, these apparently two particles would be counted separately, and the quantitative function of the apparatus would be thereby frustrated. However, in accordance with the invention, back-up circuits supplement the function of means 10, to assure that such an erroneous counting cannot take place. This additional circuitry is so devised that pulses can only reach the second input of the AND gate 7 when it is ascertained that signals in two successive scan lines no longer overlap in the scanning direction. If, therefore, the chord-length advance (of the length discrimination) is so great that no B signal is produced for a given scan line through an irregular-shaped particle, then the discriminating means 10 will not be the cause of counting-pulse generation via gate 7.

The B signal from the chord-length discrimination means 10 passes via an OR gate 11 to the setting input of the bi-stable device 8; the latter is thus set as soon as means 10 produces an L signal. Device 8, being thus reset, conditions its output (at C) with an L signal, so that an L signal is also applied via a control line 14 to electronic switches 15 between two further delay lines 16 and 17.

The delay lines 16–17 are shown as shift registers. Register 16 is fed with the binary signal A from the discriminator and is shifted progressively, in the left-to-right direction of its outputs, in accordance with clock pulses supplied by a clock generator 18. As soon as the switches 15 are closed, the signal is passed from the particular output tap of the shift register 16 (i.e., the output tap which the delayed A signal has by then reached) to the corresponding input tap of the shift register 17. The shift register 17 is connected in series with another shift register 19, having a delay time $T_2$ which is smaller than the time $T_1$ for a complete line scan, and all registers 16-17-19 are shifted by the same clock pulses. The delay time of shift register 17 is at most $T_1$–$T_2$ so that, upon signal passage between registers 16–17 via the left-most switch 15, the A signal will have been delayed by a full line-scanning interval; and in the event of such signal passage via the right-most switch 15, the total delay time of registers 17 and 19 corresponds to the period $T_2$. For signal passage via intermediate tap-connection switches 15, the delay times are correspondingly differentiated.

The output signal of shift register 19 also passes via the OR gate 11 to the input of the bi-stable device 8.

Erasure of the bi-stable device 8 takes place via a negated OR gate 20, either from the trailing edge of the direct discriminator signal (A) or from the trailing edge of the delayed A signal (i.e., delayed at 5, by $T_1$), depending on which of the two trailing edges occurs later.

Figure 5:
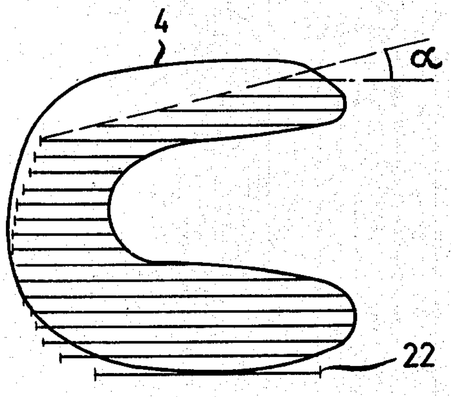
FIG. 5 depicts the particle of FIG. 3, in the context of scan-line treatment by the apparatus of FIG. 1.

The manner of operation of the apparatus of FIG. 1 is as follows:

The direct A signal of the first line (FIG. 3) sets the shift register 16 in operation. Only when the B signal (FIG. 4) of the first line commences is the bi-stable device 8 set, via the OR gate 11; its output signal occurs at point C and is shown in FIG. 5. As can be noted, the C signal of the first line corresponds to the B signal of the first line. The C signal passes as a control signal, via the line 14, to close the switches 15. In the example shown, the time interval between the start of the A signal and the start of the C signal is so great that the A signal has passed entirely through the shift register 16 and has arrived at its right output terminal, before switch closure at 15. Therefore, if switches 15 are then closed by the C signal, the A signal of the first line will pass into the shift register 19 and will be there delayed at most by a time $T_2$ which is shorter than a line scanning period $T_1$. Upon termination of the A signal of the first line, the bi-stable device 8 is turned off via the OR gate 20, and switches 15 are returned to their open condition, as shown. After the time $T_2$, which is shorter than $T_1$ the stored and delayed signal of the first scanning line appears at the output of shift register 19, is then fed to OR gate 11 and sets the bi-stable device 8, so that C-signal starts. The starting point of this C-signal lies for an interval $T_1$–$T_2$ in front of the starting point of the B-signal of the second scanning line, since this B-signal really starts after one scanning period $T_1$ has elapsed.

In the second line of the A signal, the bi-stable device 8 is thus set by the signal coming from the shift register 19 via the OR gate 11 at a time which precedes the start of the second line of the B signal. The start of the C signal of the second line is therefore shifted towards the left, as shown by FIG. 5, the amount of shift being determined by the time difference $T_1$–$T_2$.

In each succeeding scan line, the C signal commences progressively earlier, in each case by the same time interval, so that the leading edges of successive lines of the C signal lie on a sloping alignment which forms an angle $\alpha$ with the scan-line direction, as shown in FIG. 5.

Upon reaching the scan line at which onset of the C signal reaches the front contour of the particle, the bi-stable device 8 will have been already set at the start of the binary signal A of the corresponding line. In this case, switch means 15 is closed via the line 14 at an instant when a signal is present only on the left-most switch 15, so that both delay lines 17 and 19 become fully operative, the total delay time being then $T_1$. Therefore, in the next-succeeding line, the C signal is terminated at a time which corresponds to the start of this signal in the previous line of the A signal. In this way, the entire particle is scanned in the manner shown in FIG. 5, i.e., with the start of the signal in each line of the C signal corresponding to the start of the signal in the preceding line of the A signal.

In the last scanning line, the bi-stable device 8 is set by a signal of the delay lines 17 and 19 at a time which corresponds to the start of the A signal of the last scanning line. The turning off of the device 8 takes place via the delay line 5 at the time of the end of the signal in the last scanning line of the A signal, i.e., the last line of the C signal corresponds precisely to the last line of the A signal, shifted downward by one line.

In the apparatus of FIG. 1, the C signal is fed to an input of the AND gate 7. Thus, when a C-signal pulse and an anticoincidence pulse occur at both inputs of this gate at the same time, a first and only counting pulse may be obtained for the particle 4, at output 21. In FIG. 5, this condition is first reached at the scan line 22.

The apparatus of FIG. 1 further includes a search-signal generator, and it will be understood that the generated search signal may be either an individual pulse or a pattern of pulses to identify a local field of interest within the overall viewing field. For example, using a two-component gating device 24 synchronized with line and frame synchronizing pulses of the TV-camera output, the search signal can be so developed as to correspond to a localized rectangle in the monitor picture; knobs 25 and 26 suggest selectively adjustable means whereby the width and height of such a localized rectangle can be selected, and a control stick 27 will be understood to suggest means whereby the localized point or area of the total search signal can be selectively displaced into any desired position within the entire field to be scanned. The control stick 27 may be universally movable, with a two-component pick-off for determining the instantaneous location of the search signal or signals in the field of view; by legend, it is indicated that the search signal is connected for superposed display in the field of the TV monitor.

Output of the search-signal generator 23 is shown connected via a switch 28 to a third input of the OR gate 11, and a dashed-line interconnection of switches 9–28 suggests interlocked alternating closure of these switches. Thus, when switch 9 is open (and switch 28 is closed), the search signal from generator 23 (rather than the B signal) will pass the OR gate 11 to become determinative of C signal output at the bi-stable device 8.

Figure 6:
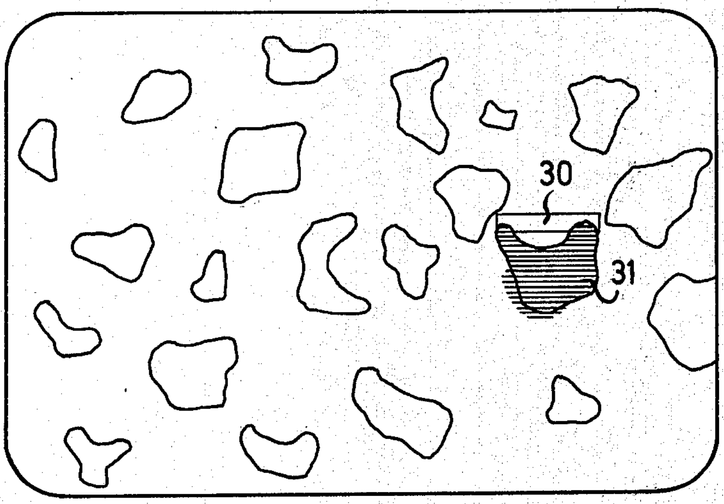
FIG. 6 depicts a displayed field area (to be scanned) in which an individual particle has been selected for evaluation, by particle-selection means of the apparatus of FIG. 1.

FIG. 6 illustrates a specific use for the described search-signal generating means 23–24, all in the context of a field of different objects to be scanned and evaluated. Upon closing switch 28, an intensified rectangle 30 appears on the monitor display, corresponding to the localized-field pulse pattern supplied by generator 23, the length and width dimensions of rectangle 30 being in response to the setting of knobs 25–26. The localized search field 30 is shifted by means of the control stick 27 until the display of the search field coincides with at least part of an object which is to be evaluated. In the example shown in FIG. 6, this is the object 31.

As soon as the condition shown in FIG. 6 has been reached, the A signal corresponding to the particle 31 and produced by discriminator 1 passes to an input of the AND gate 12, the other input of which is supplied with the output signal C of the bi-stable device 8. Since the bi-stable device 8 is set, via the OR gate 11, either by an output signal from the delay line 19 or by the output signal from generator 23, the evaluation unit 29 will be conditioned by means 12 to receive an evaluation signal (as from output 21) as long as the scanning beam moves within the boundaries of the particle 31.

As soon as the bi-stable device 8 is set, a signal is produced over the delay lines 17 and 19, this signal being delayed by one line-scan period. This signal assures that, after termination of the search field 30, a C signal is continued to be produced as long as the scanning beam moves within the boundaries of the selected particle 31. In this FIG. 6 situation, in the same way as demonstrated for FIG. 5, particle scanning is effected such that the C signal commences for each succeeding line at the time of commencement of the A signal in the next-preceding scan line.

The evaluation unit 29 shown in FIG. 1 may, for example, include means to integrate (e.g., to cummulatively add the time duration of) the binary signals fed to it from the output C and thus effect an area measurement of the selected particle 31.

Figure 2:
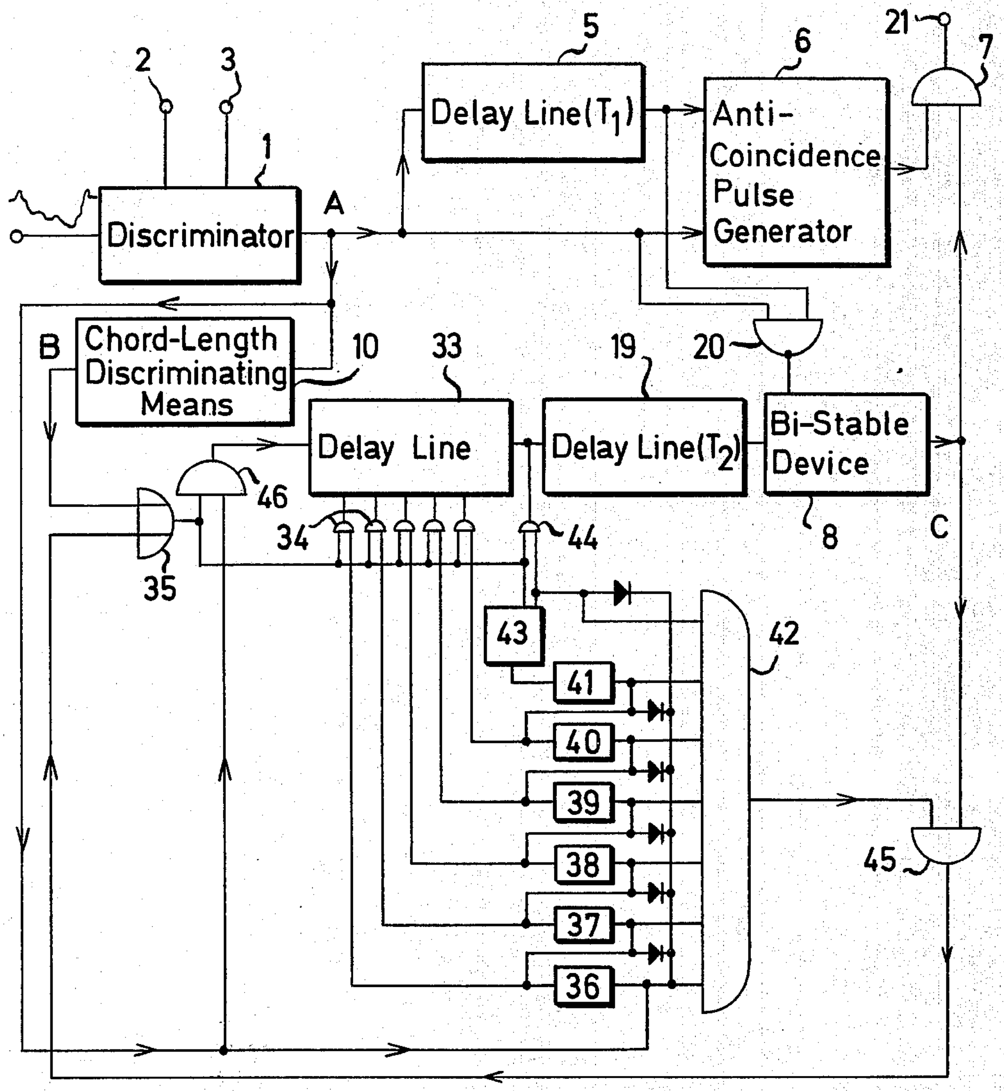
FIG. 2 is a similar diagram for another embodiment of the invention.

FIG. 2 shows another embodiment of the invention, corresponding parts being given reference numbers already identified. In FIG. 2, a single delay line 33 is used instead of the two delay lines 16 and 17 of FIG. 1. Delay line 33 is connected in series with the delay line 19 and has the various progressively staggered input tap connections. Depending on the input which is activated, the delay time of the line 33 is also set here, the delay time again lying between the values of ($T_1$–$T_2$) and zero. The delay line 19 is connected directly with the bi-stable device 8 and serves to set said device.

The input taps of the delay line 33 are connected with separate AND gates 34. One input of each of these AND gates is connected to the output of an OR gate 35. The other input of each of the AND gates 34 is connected with a further delay line which is formed by and between multivibrator elements 36 and 43; in this further delay line, 36, 37, 38, 38, 39, 40 and 41 are series-connected mono-stable flip-flops which are individually de-coupled by means of diodes with respect to an AND gate 42. The mono-stable device 36 is set by the leading edge of the A signal from the discriminator 1; after a time $\Delta t$, it flops back to its original state, thus producing a trailing-edge starting pulse which sets the next mono-stable device 37. The latter 37 remains set for a next-succeeding time $\Delta t$, and its trailing edge sets the following mono-stable device 38. In this way, there is produced one after the other and in short succession a series of pulses at the inputs of the respective gates 34. The last mono-stable device 41 is connected, via a bi-stable device 43 (which may, for example, be a flip-flop), with one input of an AND gate 44 which serves to feed a signal directly to the input of the delay line 19.

In application of the apparatus of FIG. 2 to the example shown in FIGS. 3 and 5, and in the first line of the B signal (FIG. 4) actuated by the A signal from the discriminator 1, all mono-flops 36 to 41 will have run out and will have set the flip-flop 43 before the leading edge of the B signal releases the AND gate 44 via the OR gate 34; thus, no part of the first line of the C signal of FIG. 5 appears in a FIG. 2 operation. However, in succeeding lines, the start of the C signal is step-finished to the left, by the increment $T_2$, as shown in FIG. 5. In this connection, the AND gate 45 is opened in response to C-signal output of the bi-stable device 8 and in response to concurrent operation of the AND gate 42, thus delivering the release pulse via the OR gate 35 to the AND gate 44. As soon as the front, and somewhat vertically extending, edge of the particle is reached, both delay lines 33 and 19 are connected, the signal passing via the gates 45 and 35 to one input of AND gate 46, it being noted the A signal is applied directly to the other input of AND gate 46.

From the foregoing discussion, it will be seen that for the embodiment of FIG. 2, and for the full scan of a given single particle, the C signal corresponds to that described for operation of the embodiment of FIG. 1, with the single exception that the first scan-line component of the C signal does not occur in a FIG. 2 operation.

While the invention has been described in detail for the indicated embodiments, it will be understood that modifications may be made within the scope of the invention. For example, the search-signal generator of FIG. 1 may be incorporated into the apparatus of FIG. 2, by the simple provision of a third input to the OR gate 35, the search-signal means (as at 23–24) having an output connection to such third input, and there being provision for selective switching (as at 9–28) of the devices 10–23 in their alternative connection to the OR gate 35.

What is claimed is:

1. In the method of electronic-image analysis within a field of raster-scanned subject matter in which each scanning line lying within the boundaries of an object to be evaluated supplies by means of a discriminator a binary signal corresponding to the line length between object-boundary intercepts for the particular line, the improvement which comprises producing a localized search signal synchronized with raster scanning such that the search signal is effectively located within at least part of the scan-line coverage of the object; using said search signal to start an output signal which at the same time controls the delay time of said binary signal of the same line for a period lying between a scan line period $T_1$ and a minimum time $T_2$, such delay time being for each scan line within said object to be evaluated a function of the time interval between (*a*) the start of said binary signal of said each scan line and (*b*) said output signal of the preceding scan line, and said delay time having at least the minimum value $T_2$; the output signal in each succeeding scan line being started by the delayed output signal of the preceding scan line; further delaying the binary signal of each scan line by one scan line period, and producing an anticoincidence pulse when said delayed signal and the signal coming from the line just scanned do not overlap; and generating an evaluation-output signal when said output signal and said anticoincidence pulse coincide.

2. In a method of electronic-image analysis within a field of raster-scanned subject matter in which each scanning line lying within the boundaries of an object to be evaluated supplies by means of a discriminator a binary signal corresponding to the line length between object-boundary intercepts for the particular line, the improvement which comprises producing a localized search signal synchronized with raster scanning such that the search signal is effectively located within at least part of the scan-line coverage of the object; using said search signal in the first line scan for which said object and said search signal coincide to control the delay time of said binary signal of the same scan line, said delayed binary signal starting an output signal; using in each succeeding scan line the output signal of the preceding line to control the delay line of the binary signal of said each scan line, the delay time of said binary signal being so controlled that it lies between a scan line period $T_1$ and a minimum time $T_2$ and depends upon the time interval between the start of said binary signal and of (a) said output signal or (b) said search signal, depending upon which of the two last-mentioned signals starts earlier; further delaying the binary signal of each scan line by one scan line period and producing an anticoincidence pulse when said delayed signal and the signal coming from the line just scanned do not overlap, and generating an evaluation-output signal when said output signal and said anticoincidence pulse coincide.

3. In the method of claim 2 wherein a visual monitoring display is presented, the improvement wherein the search signal is selectively positionable throughout the field of raster scan, the local position of the search signal in the field being displayed in the monitoring display.

4. In the method of claim 2, the improvement wherein the search signal is generated for each line of scan by shortening by a predetermined amount the binary signal from the discriminator, the thus-shortened signal being used as the search signal.

5. In the method of claim 2 wherein a single count is to be developed for each discrete object scanned in the field, the improvement wherein said evaluation-output signal is a single pulse for each coincidence of said output signal with said anticoincidence pulse.

6. Apparatus for electronic-image analysis within a field of raster-scanned subject matter, comprising a discriminator having an input adapted to receive a video signal derived by such raster-scanning and producing a binary-signal output wherein each binary signal corresponds to the scanned line length between object-boundary intercepts for the particular line, local search-signal generator means so synchronized with raster scanning that the search signal generated thereby is effectively located within at least part of the scan-line coverage of a discriminated object, control means including a delay device and having an input connection from said discriminator and producing an output signal, said delay device controlling for each scan line the delay time of the binary signal of the same scan line, the operative delay time of said device being between a maximum period $T_1$ and a minimum period $T_2$ wherein $T_1$ is the line-scan period; said device including means establishing the delay time in each scan line as (*a*) said minimum period $T_2$, or (*b*) the time interval between start of the binary signal and of said output signal for the preceding scan line, whichever of (*a*) and (*b*) is first to occur; anticoincidence-pulse generator means connected to said discriminator and including delay means operative to delay the binary signal to the extent of a single scan-line period, and evaluation-signal generator means including a coincidence detector operatively connected to said delay device and to said anticoincidence-pulse generator means for generating an evaluation-signal output when said output signal and the generated anticoincidence pulse coincide.

7. Apparatus according to claim 6, in which said coincidence detector includes an AND gate.

8. Apparatus according to claim 6, in which said switches connected to the inputs of said first delay line comprise AND gates, a serially interconnected plurality of monostable devices each having an output control connection to the input of a different AND-gate, and a reset connection to each of said monostable devices from the output of said bi-stable means.

9. Apparatus for electronic-image analysis within a field of raster-scanned subject matter, comprising a discriminator having an input adapted to receive a video signal derived by such raster-scanning and producing a binary-signal output wherein each binary signal corresponds to the scanned line length between object-boundary intercepts for the particular line, local search-signal generator means so synchronized with raster scanning that the search signal generated thereby is effectively located within at least part of the scan-line coverage of a discriminated object, control means including a delay device and having an input connection from said discriminator and producing an output signal, said delay device controlling for each scan line the delay time of the binary signal of the same scan line, the operative delay time of said device being between a maximum period $T_1$ and a minimum period $T_2$ wherein $T_1$ is the line-scan period; said device including means establishing the delay time in each scan line as (*a*) said minimum period $T_2$, or (*b*) the time interval between start of the binary signal and of said output signal for the preceding scan line, whichever of (*a*) and (*b*) is first to occur; anticoincidence-pulse generator means connected to said discriminator and including delay means operative to delay the binary signal to the extent of a single scan-line period, and evaluation-signal generator means including a coincidence detector operatively connected to said delay device and to said anticoincidence-pulse generator means for generating an evaluation-signal output when said output signal and the generated anticoincidence pulse coincide; said delay device including two series-connected delay lines, the second of which is characterized by said predetermined delay $T_2$ and the first of which is of the multi-tap variety, the effective delay time of said first delay line ranging from zero to a time corresponding to the difference between $T_1$ and $T_2$ depending upon the particular input tap to which an input signal is applied, separate switches associated with the respective taps of said first delay line, means for connecting the binary-signal output of said discriminator to said first delay line via said switches, an output connection for the delay means of said anticoincidence-pulse generator means, whereby a one-line delayed binary signal is available, bi-stable means having set and reset connections, the set connection being to the output of said second delay line and the reset connection being via an OR gate to (*c*) the output of said discriminator and (*d*) to the output connection of the delay means of said anti-coincidence-pulse generator means, the delay-device connection to said evaluation-signal generator means being supplied by the output of said bi-stable means, and a control connection to said switches from the output of said bi-stable means.

10. Apparatus according to claim 9, in which the set input connection to said bi-stable means includes an OR gate having two separate input connections the first of which is to the output of said second delay line, chord-length discriminating means having an input connection to the binary-signal output of said discriminator and an output connection to the other of said two connections.

11. Apparatus according to claim 10, in which said search-signal generator means includes a selectively controllable generator of a pulse signal synchronized with raster scanning and effectively positionable throughout the field of raster scan, and selectively operable means for connecting the output of said selectively controllable generator to an input of said OR gate.

12. Apparatus according to claim 11, and including selectively operable means effective to selectively connect said chord-length discriminating means to said OR gate, said last-defined means being interlocked with the selectively operable means of claim 9 such that at any one time said OR gate is connected to only one of said chord-length discriminating means and of said selectively controllable generator.

13. Apparatus according to claim 9, in which said first delay line includes a shift register with a plurality of inputs defining said taps.

14. Apparatus according to claim 13, in which said means for connecting binary-signal output of the discriminator to said switches is a second shift register having plural outputs connected via the respective switches to the inputs of said first shift register.

15. In the method of electronic-image analysis within a field of raster-scanned subject matter in which each scanning line lying within the boundaries of an object to be evaluated supplies by means of a discriminator a binary signal corresponding to the line length between object-boundary intercepts for the particular line, the improvement which comprises: producing a localized search signal synchronized with raster scanning such that the search signal is effectively located within at least part of the scan-line coverage of the object; using, in the first line scan where said object and said search signal coincide, the search signal to start a control signal; delaying said binary signal for a period lying between a scan line period $T_1$ and a minimum time $T_2$; using said control signal to control the delay time of said binary signal so that it corresponds to the time interval between the start of the binary signal and said control signal, but having the minimum value $T_2$; using in each succeeding scan line the delayed binary signal of the preceding scan line as the control signal; and generating an evaluation-output signal during the period in which said last-mentioned control signal and said binary signal coincide.

16. In the method of claim 15, the improvement of additionally delaying said binary signal of each scan line by one scan line period, producing an anticoincidence pulse when said delayed signal and the binary signal coming from the line just scanned do not overlap, and generating an evaluation pulse when said last-mentioned control signal and said anticoincidence pulse coincide.

17. Apparatus for electronic-image analysis within a field of raster-scanned subject matter, comprising a discriminator having an input adapted to receive a video signal derived by such raster-scanning and producing a binary-signal output wherein each binary signal corresponds to the scanned line length between object-boundary intercepts for the particular line, local-search-signal generator means so synchronized with raster scanning that the search generated thereby is effectively located within at least part of the scan-line coverage of a discriminated object, control means having an input-connection from said discriminator and a control-input, said control means including a delay device the delay time of which is controllable via said control-input between a maximum period $T_1$ and a minimum period $T_2$, wherein $T_1$ is the line-scan period, an OR-gate having two separate input connections the first of which is to the output of said control means, the second is to the output of said local search-signal generator means, the output of said OR-gate being connected to said control-input of said control means, an AND-gate having two separate input connections the first of which is to the output of said control means and the second of which is to the output of said discriminator, and evaluation means connected to the output of said AND-gate.

* * * * *